US007479746B2

(12) United States Patent
Rozman et al.
(10) Patent No.: US 7,479,746 B2
(45) Date of Patent: Jan. 20, 2009

(54) POWER CONVERTER FOR AN ELECTRIC ENGINE START SYSTEM

(75) Inventors: Gregory I. Rozman, Rockford, IL (US); Richard J. Lapointe, Ellington, CT (US); Douglas A. Parsons, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 685 days.

(21) Appl. No.: 10/806,635

(22) Filed: Mar. 23, 2004

(65) Prior Publication Data

US 2005/0212466 A1 Sep. 29, 2005

(51) Int. Cl.
*H02P 1/54* (2006.01)
*H02P 5/00* (2006.01)
*H02P 5/46* (2006.01)

(52) U.S. Cl. ......................... 318/98; 318/101; 318/453; 318/623

(58) Field of Classification Search .................. 318/98, 318/101, 453, 623
See application file for complete search history.

(56) References Cited

U.S. PATENT DOCUMENTS 4,949,021 A 8/1990 Rozman et al.
4,973,896 A * 11/1990 Shiga et al. .................. 322/28
4,992,721 A * 2/1991 Latos ......................... 322/10
5,029,263 A 7/1991 Rozman
5,574,345 A * 11/1996 Yoneta et al. ............... 318/376
6,018,233 A 1/2000 Glennon
6,037,752 A 3/2000 Glennon
6,128,204 A * 10/2000 Munro et al. ................. 363/41
6,134,124 A * 10/2000 Jungreis et al. ............... 363/34
6,426,608 B2 * 7/2002 Amano et al. ............... 320/163
6,665,158 B2 * 12/2003 Walter ......................... 361/18
2004/0008527 A1 * 1/2004 Honda ......................... 363/39

OTHER PUBLICATIONS

U.S. Appl. No. 10/893,462, filed Jul. 16, 2004.
U.S. Appl. No. 10/881,309, filed Jun. 30, 2004.
U.S. Appl. No. 10/872,625, filed Jun. 21, 2004.

* cited by examiner

*Primary Examiner*—Walter Benson
*Assistant Examiner*—Erick Glass
(74) *Attorney, Agent, or Firm*—Carlson, Gaskey & Olds

(57) ABSTRACT

An electric engine starting system includes a permanent magnet motor that is used to start the engine and then to generate power for powering a load while the engine is running. A disclosed system includes a first phase controlled rectifier in series with a power converter and a second phase controlled rectifier. During an engine starting operation, the first phase controlled rectifier is switched to couple the permanent magnet motor to a power source for starting the engine. Once the engine is running, the first phase controlled rectifier is switched off and the second phase controlled rectifier is switched on. The second phase control rectifier converts variable AC power from the motor into DC power. The power converter converts the DC power into an appropriate power for driving the load. One disclosed example includes a filter between the power converter and the load to ensure that the load receives a selected quality of power.

20 Claims, 1 Drawing Sheet

POWER CONVERTER FOR AN ELECTRIC ENGINE START SYSTEM

FIELD OF THE INVENTION

This invention generally relates to electric engine start systems. More particularly, this invention relates to a power control arrangement in a system having an electric motor used to start an engine.

DESCRIPTION OF THE RELATED ART

Electric engine start systems typically include an electric motor associated with an engine, such as a gas turbine engine. The electric motor is powered to provide rotation to the engine during engine start up operations. In some situations, the electric motor is then used as a power generator after the engine has been running at a sufficient level. Example patents in this area include U.S. Pat. Nos. 4,949,021 and 5,029,263.

Example electric start systems having fault tolerant capabilities are shown in U.S. Pat. Nos. 6,018,233 and 6,037,752. Such systems include multiple power sources and loads that are connected by a switch matrix that uses multiple power converters. Such a system is relatively complex and can be overly cumbersome for some situations. There is a need for an arrangement that is more simple than previously proposed, relatively more complicated systems.

In some examples, a wound field synchronous motor is used to start the engine and then used as a power generator when the engine is running. The field of a wound field synchronous motor is controlled with an exciter and, therefore, the output voltage when the motor operates as a generator can be controlled within the variable operating range of the engine. If a permanent magnet motor were to be used as the starter and generator in such a system, electric fields associated with a permanent magnet motor cannot be controlled because the varying engine speeds cause varying speeds in the motor. There is a need for controlling the generated power output from a permanent magnet motor, which can vary as the engine speed varies.

This invention provides a power control arrangement for utilizing a single permanent magnet motor for starting an engine and then generating power while the engine is running.

SUMMARY OF THE INVENTION

In general terms, this invention is a power control arrangement having a permanent magnet motor that is used for starting an engine and then used to generate power while the engine is running.

One example system designed according to an embodiment of this invention includes a permanent magnet motor that is adapted to be coupled with the engine such that the motor and engine rotate simultaneously. A first phase controlled rectifier is associated with the motor for selectively coupling the motor to a power source. A second phase controlled rectifier is associated with the motor for selectively coupling the motor to a load. The first phase controlled rectifier is switched to couple the motor to the power source during an engine starting operation. The second phase controlled rectifier is switched to provide power generated by the motor to the load when the engine is running.

In one example, the first and second phase controlled rectifiers are switched so that one is conducting while the other is not.

A power converter in one example is in series with the first and second phase controlled rectifiers. The first rectifier is between the power converter and the power source. The second phase rectifier in this example is between the power converter and the motor. In one example, the power converter is a pulse width modulating inverter that is capable of converting the power state for various kinds of electrically driven loads, which provides greater versatility with fewer components.

An example method of controlling power distribution using an engine starting system that has a permanent magnet motor associated with the engine includes coupling the motor to a power source using a first phase controlled rectifier while starting the engine. Coupling the motor to a load using a second phase controlled rectifier provides power generated by the motor to a load when the engine is running.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENT

Figure 1:
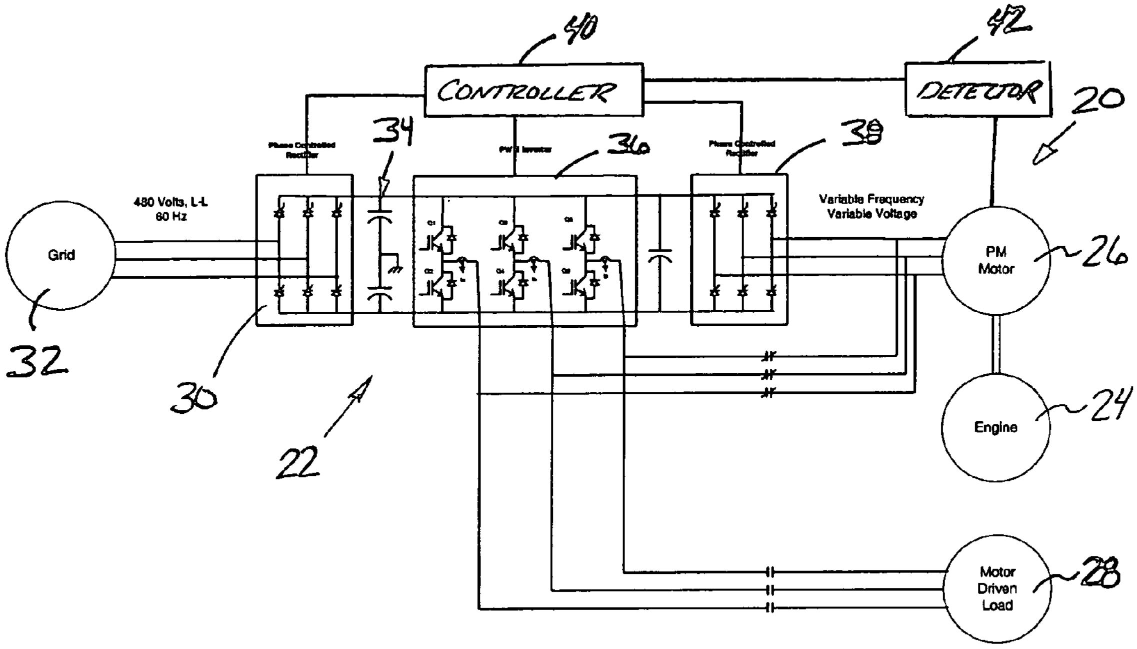
FIG. 1 schematically illustrates an engine start system designed according to an embodiment of this invention.

FIG. 1 schematically shows a gas turbine engine assembly 20 that includes a power distribution system 22. The assembly 20 includes a gas turbine engine 24 and a permanent magnet motor 26 that is used for starting the engine 24. The permanent magnet motor 26 is also used to generate power for powering a load 28 when the engine 24 is running.

A first phase controlled rectifier 30 includes a rectifier bridge arrangement and is used for selectively coupling the motor 26 to a power source 32. The first phase controlled rectifier 30 provides a soft pre-charge function for a DC link capacitor bank 34. During an engine starting operation, the first phase controlled rectifier 30 insure a slow charge of the capacitor until a power ready signal indicates that variable power should be provided to the permanent magnet motor 26.

A power converter 36 is switched to couple the power source 32 to the permanent magnet motor 26 for providing variable voltage, variable frequency power to the permanent magnet motor 26 to start the engine 24. During the engine starting operation, a second phase controlled rectifier 38 is not enabled (i.e., turned off).

After the engine starting operation has been successfully completed, the first phase controlled rectifier 30 is disabled and the second phase controlled rectifier 38 can be enabled to selectively provide power generated by the motor 26 to the load 28. As known, when the engine 24 is running, the permanent magnet motor 26 will be rotating and generating electrical power. The second phase controlled rectifier 38 converts the variable AC voltage from the permanent magnet motor 26 into a constant DC voltage power state. The power converter 36 then converts the DC power into AC power. In one example, the AC power preferably has a constant frequency and a constant voltage.

When the first phase controlled rectifier 30 is enabled, the second phase controlled rectifier 38 is disabled. When either one is turned on, the other is turned off so that the load 28 will not be directly coupled to the power source 32, for example.

The example of FIG. 1 includes a controller 40 that controls the switching states of the phase controlled rectifiers 30, 38 and the power converter 36. A detector 42 associated with the permanent magnet motor 26 provides information to the controller regarding the operating state of the motor so that the controller 40 appropriately controls the switches of the power distribution system 22 to achieve a desired result. Given this description, those skilled in the art will be able to select from among various detecting and switching strategies to meet the needs of their particular situations.

In some situations, the load 28 may be particularly sensitive to any variations in frequency or voltage. The embodiment shown in FIG. 2 includes a filter 50 that filters the power generated by the motor 26 before it is provided to the load 28. The filter 50 ensures that a sufficient quality of power is provided to the load 28.

In the illustrated example, the filter 50 includes a differential mode filter 52 and a common mode filter 54. Given this description, those skilled in the art will be able to select from among known filters to meet the needs of their particular situation.

By having first and second phase rectifiers 30 and 38 in series with the power converter 36 and controlling them as described above, the disclosed examples provide the ability to power a permanent magnet motor to start an engine and then to use the permanent magnet motor as a power generator to supply power to a load when the engine is running. The disclosed examples utilize a single permanent magnet motor and a single power converter to achieve these functions. In the disclosed examples, the power converter 36 comprises a pulse width modulating inverter that is capable of handling various types of power conversion. For example, the disclosed pulse width modulating inverter is capable of handling three-phase power for AC motors, such as permanent magnet motors and induction motors. In one example, the pulse width modulating inverter is modified (not illustrated) such that a switched reluctance motor can be supported by an embodiment of this invention.

In another embodiment, the motor 26 regenerates power to the grid or other source under certain conditions. In such an example, the second phase controlled rectifier 38 selectively couples the motor 26 to the power source in addition to or in place of the powered load 28.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A system for starting an engine and generating power while the engine is running, comprising:

a permanent magnet motor;

a first phase controlled rectifier associated with the motor for selectively coupling the motor to a power source for providing power to the motor from the power source during an engine starting operation; and a second phase controlled rectifier associated with the motor for selectively coupling the motor to a load, for providing power from the motor to the load if the permanent magnet motor is coupled with the engine and rotating simultaneously with the engine and the engine is running.

2. The system of claim 1, wherein the first and second phase controlled rectifiers are switched such that one is conducting while the other is off.

3. The system of claim 1, including a power converter associated with the first phase controlled rectifier for converting power from the source to a variable voltage, variable frequency power supplied to the motor during the engine starting operation.

4. The system of claim 1, including a DC link capacitor bank between the first phase controlled rectifier and the motor and wherein the first phase controlled rectifier controls an amount of current provided to the capacitor bank when the power source begins to provide power to the motor.

5. The system of claim 1, wherein the second phase controlled rectifier converts power generated by the motor into a constant DC voltage and including a power converter associated with the second phase controlled rectifier for converting the constant DC voltage into AC power supplied to the load.

6. The system of claim 5, including at least one filter between the inverter and the load to provide a selected power quality.

7. The system of claim 6, wherein the at least one filter comprises a differential mode filter in series with a common mode filter.

8. The system of claim 1, including a pulse width modulating converter in series with the phase controlled rectifiers for converting power supplied to the motor or received from the motor into a desired state.

9. A method of controlling power distribution using an engine starting system having a permanent magnet motor associated with the engine such that the motor and the engine rotate simultaneously, comprising the steps of:

coupling the motor to a power source using a first phase controlled rectifier while starting the engine; and coupling the motor to a toad using a second phase controlled rectifier to provide power generated by the motor to the load when the engine is running.

10. The method of claim 9, including enabling one of the first or second phase controlled rectifiers when the other is disabled.

11. The method of claim 9, including converting power from the source to a variable voltage, variable frequency power supplied to the motor while starting the engine.

12. The method of claim 9, including using the first phase controlled rectifier to control an amount of current provided to a capacitor bank between the power source and the motor.

13. The method of claim 9, including using the second phase controlled rectifier to convert power generated by the motor into a constant DC voltage.

14. The method of claim 13, including converting the constant DC voltage into AC power supplied to the load.

15. The method of claim 14, including filtering the power supplied to the load to provide a selected power quality.

16. A gas turbine engine assembly, comprising:

a gas turbine engine;

a permanent magnet motor at least selectively coupled with the engine such that the motor and corresponding portions of the engine rotate simultaneously;

a power converter in series with the motor;

a first phase controlled rectifier in series with the power converter on an opposite side of the converter from the motor;

a second phase controlled rectifier in series the power converter between the power converter and the motor; and a controller that controls the first phase controlled rectifier to couple the motor to a power source for starting the engine and enables the second phase controlled rectifier to couple the motor to a load for providing power to the load when the engine is running.

17. The assembly of claim 16, wherein the controller disables one of the phase controlled rectifiers when the other is enabled.

18. The assembly of claim 16, wherein the power converter comprises a pulse width modulating inverter.

19. The assembly of claim 16, including a filter between the power converter and the load for filtering power generated by the motor and convened by the power converter before the converted power is provided to the load.

20. The assembly of claim 19, wherein the filter provides a selected quality of power to the load.

* * * * *

UNITED STATES PATENT AND TRADEMARK OFFICE
CERTIFICATE OF CORRECTION

PATENT NO. : 7,479,746 B2

APPLICATION NO. : 10/806635
DATED : January 20, 2009
INVENTOR(S) : Gregory I. Rozman It is certified that error appears in the above-identified patent and that said Letters Patent is hereby corrected as shown below:

The Title Page, showing an illustrative figure, should be deleted and substitute therefor the attached Title Page.

Figure 2:
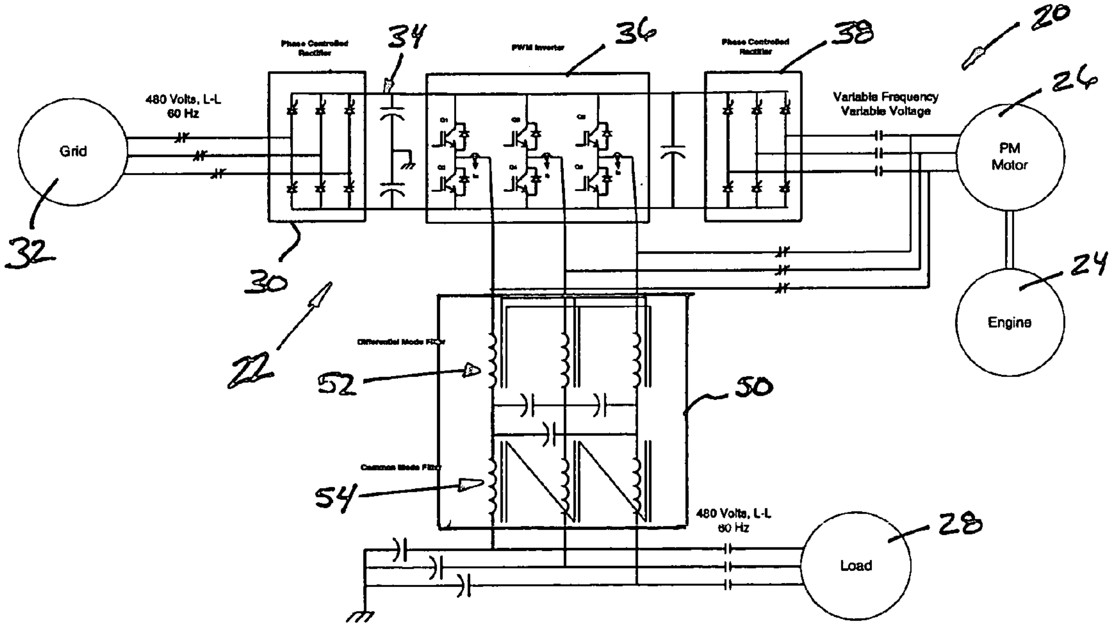
FIG. 2 schematically illustrates selected portions of a second embodiment of an engine start system.
Figure 1:
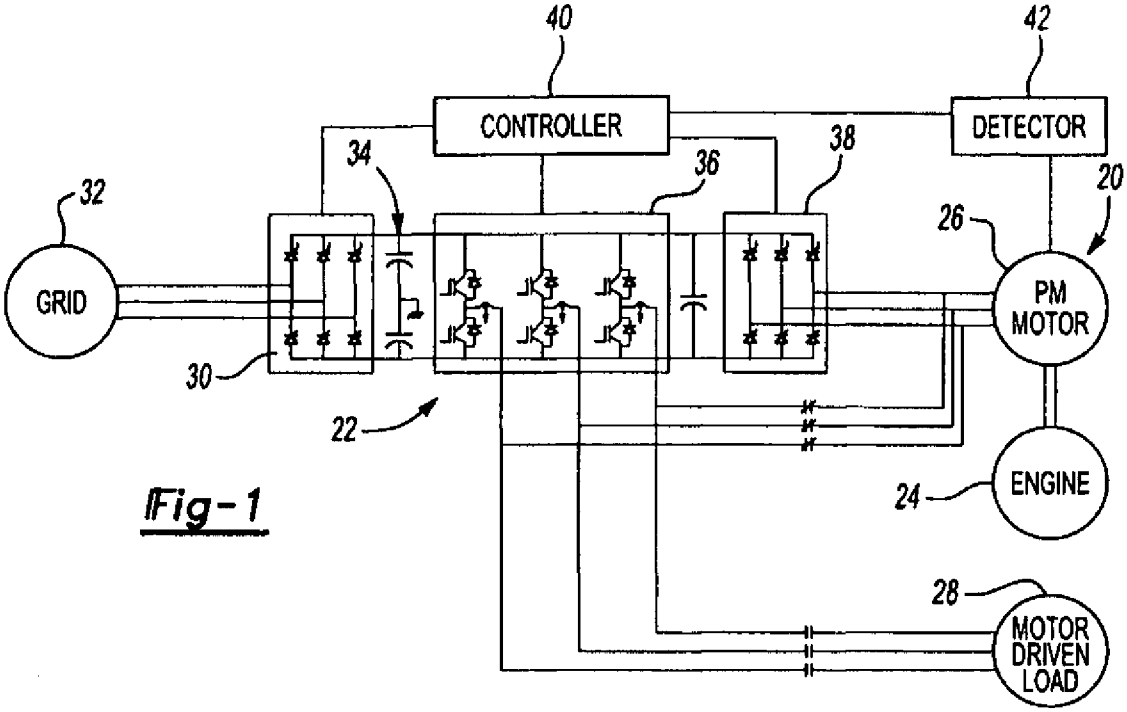
Figure 2:
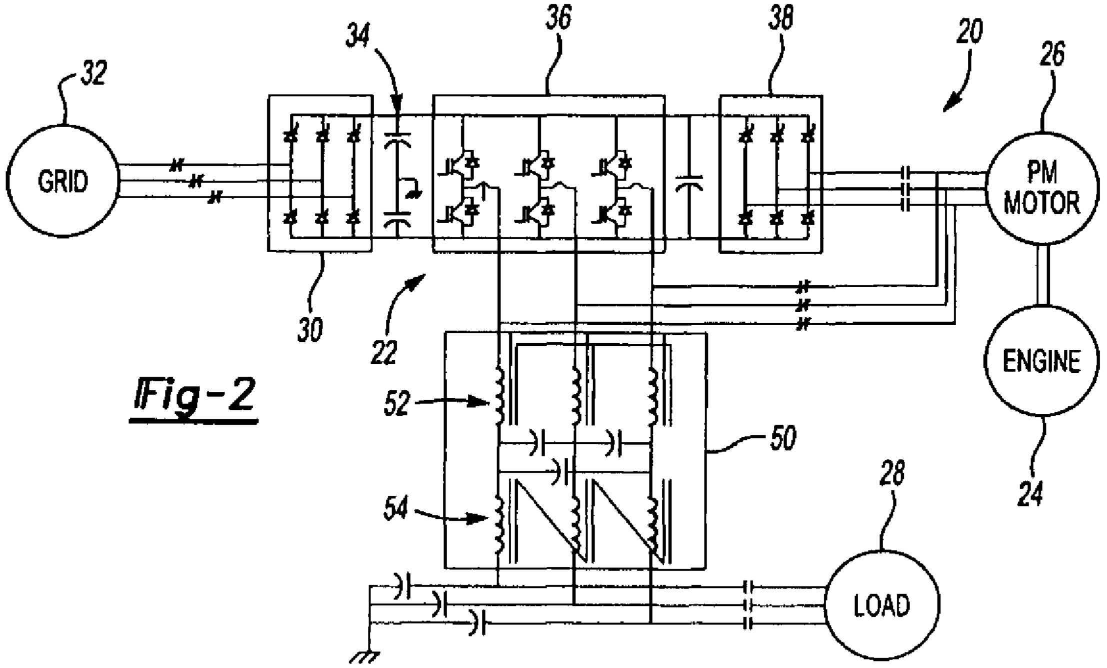

Delete drawing sheet and substitute therefor the drawing sheet, consisting of figs. 1 and 2 as shown on the attached page.

IN THE CLAIMS:

Claim 6, Column 4, line 20: "inverter" should read as --converter--.

Claim 9, Column 4, line 35: "toad" should read as --load--.

Claim 19, Column 6, line 3: "convened" should read as --converted--.

Signed and Sealed this

Fourth Day of August, 2009

John Doll

JOHN DOLL
*Acting Director of the United States Patent and Trademark Office*

(12) United States Patent
Rozman et al.

(10) Patent No.: US 7,479,746 B2
(45) Date of Patent: Jan. 20, 2009

(54) POWER CONVERTER FOR AN ELECTRIC ENGINE START SYSTEM

(75) Inventors: Gregory I. Rozman, Rockford, IL (US); Richard J. Lapointe, Ellington, CT (US); Douglas A. Parsons, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 685 days.

(21) Appl. No.: 10/806,635

(22) Filed: Mar. 23, 2004

(65) Prior Publication Data

US 2005/0212466 A1 Sep. 29, 2005

(51) Int. Cl.
*H02P 1/54* (2006.01)
*H02P 5/00* (2006.01)
*H02P 5/46* (2006.01)

(52) U.S. Cl. .................... 318/98; 318/101; 318/453; 318/623

(58) Field of Classification Search .................. 318/98, 318/101, 453, 623
See application file for complete search history.

(56) References Cited

U.S. PATENT DOCUMENTS

| | | | | |
|---|---|---|---|---|
| 4,949,021 A | | 8/1990 | Rozman et al. | |
| 4,973,896 A | * | 11/1990 | Shiga et al. | 322/28 |
| 4,992,721 A | * | 2/1991 | Latos | 322/10 |
| 5,029,263 A | | 7/1991 | Rozman | |
| 5,574,345 A | * | 11/1996 | Yoneta et al. | 318/376 |
| 6,018,233 A | | 1/2000 | Glennon | |
| 6,037,752 A | | 3/2000 | Glennon | |
| 6,128,204 A | * | 10/2000 | Munro et al. | 363/41 |
| 6,134,124 A | * | 10/2000 | Jungreis et al | 363/34 |
| 6,426,608 B2 | * | 7/2002 | Amano et al. | 320/163 |
| 6,665,158 B2 | * | 12/2003 | Walter | 361/18 |
| 2004/0008527 A1 | * | 1/2004 | Honda | 363/39 |

OTHER PUBLICATIONS

U.S. Appl. No. 10/893,462, filed Jul. 16, 2004.
U.S. Appl. No. 10/881,309, filed Jun. 30, 2004.
U.S. Appl. No. 10/872,625, filed Jun. 21, 2004.

* cited by examiner

*Primary Examiner*—Walter Benson
*Assistant Examiner*—Erick Glass
(74) *Attorney, Agent, or Firm*—Carlson, Gaskey & Olds

(57) ABSTRACT

An electric engine starting system includes a permanent magnet motor that is used to start the engine and then to generate power for powering a load while the engine is running. A disclosed system includes a first phase controlled rectifier in series with a power converter and a second phase controlled rectifier. During an engine starting operation, the first phase controlled rectifier is switched to couple the permanent magnet motor to a power source for starting the engine. Once the engine is running, the first phase controlled rectifier is switched off and the second phase controlled rectifier is switched on. The second phase control rectifier converts variable AC power from the motor into DC power. The power converter converts the DC power into an appropriate power for driving the load. One disclosed example includes a filter between the power converter and the load to ensure that the load receives a selected quality of power.

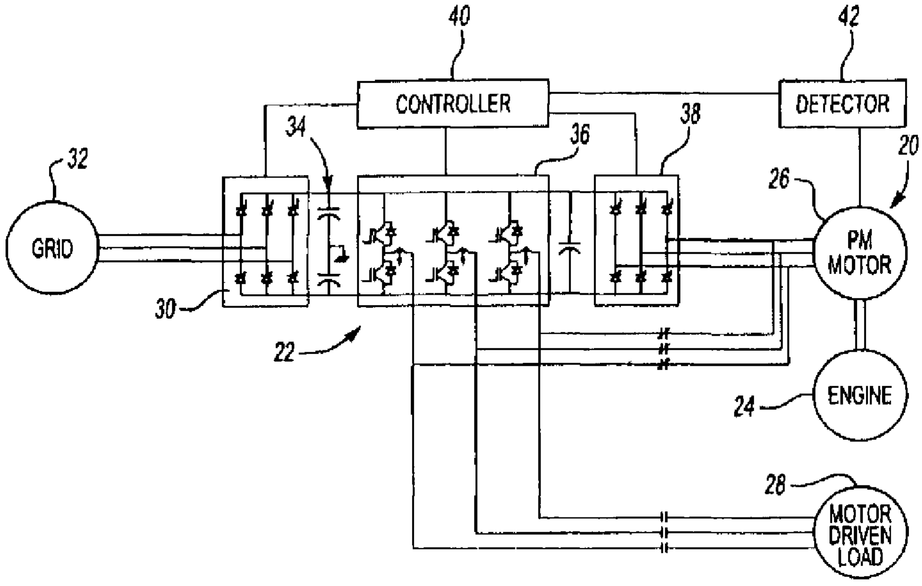

20 Claims, 1 Drawing Sheet